UNITED STATES PATENT OFFICE.

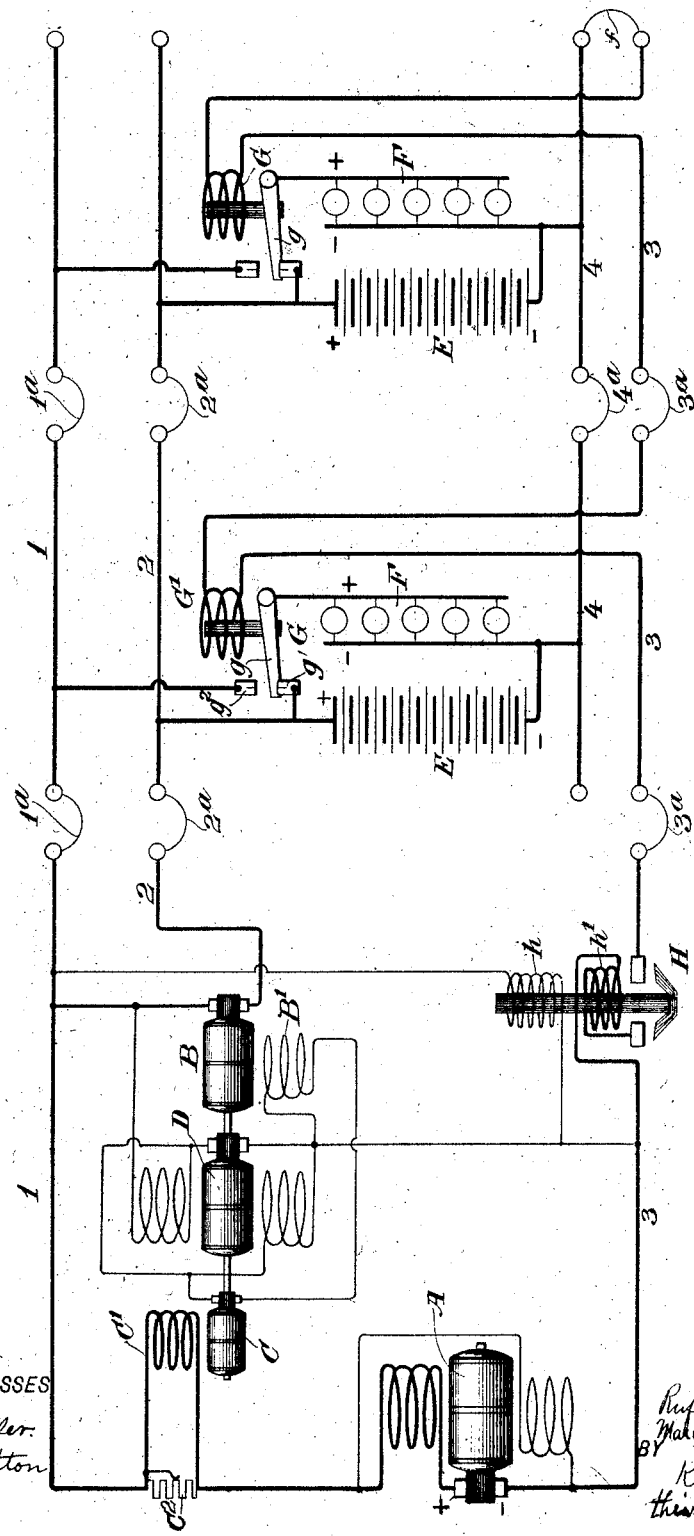

RUFUS N. CHAMBERLAIN, OF DEPEW, AND MARCELLUS R. SHEDD, OF LANCASTER, NEW YORK, ASSIGNORS TO GOULD STORAGE BATTERY COMPANY, A CORPORATION OF NEW YORK.

ELECTRICAL SYSTEM OF DISTRIBUTION.

976,151.   Specification of Letters Patent.   Patented Nov. 22, 1910.

Application filed December 17. 1906. Serial No. 348,126. Renewed April 9, 1909. Serial No. 488,973.

*To all whom it may concern:*

Be it known that we, RUFUS N. CHAMBERLAIN, a citizen of the United States, and a resident of Depew, in the county of Erie, State of New York, and MARCELLUS R. SHEDD, a citizen of the United States, and a resident of Lancaster, in the county of Erie, State of New York, have invented certain new and useful Improvements in Electrical Systems of Distribution, of which the following is a specification.

Our invention relates to electrical systems of distribution and has been specially devised with reference to systems for train lighting.

In the patent issued to RUFUS N. CHAMBERLAIN, one of the present applicants, No. 771,710, dated October 4, 1904, is shown and described a system of train lighting of the general character of that herein shown.

Our invention involves improvements upon the system of said CHAMBERLAIN patent whereby without departing from the general principles of the system covered by said patent, the system is made to operate with greater reliability and the apparatus is simplified. These features of improvement will appear in the course of the description hereinafter.

The drawing accompanying this specification is a diagram of a specific embodiment of our invention.

Generally speaking, the system includes a generating plant carried on some convenient point of the train, as, for example, the baggage car, independent batteries on the various cars to be lighted and automatic switching devices whereby the lights on the various cars may be supplied from the generating plant while the battery may be charged at a higher voltage, or the generator may be put out of operation, as for example, when the baggage cars are disconnected and the lights to each car may be supplied from the battery upon that car.

A represents a main generator comprising the prime source of electrical power for the system. This is indicated as being a compound wound generator. Preferably this generator would be rotated by a steam turbine provided with steam from the locomotive, but it is immaterial what the prime mover may be.

B represents a booster armature which would ordinarily be provided on the same car as the main generator A, as indicated in the drawing.

D is the motor mechanically connected to the booster B and driving the same. This motor is simply connected across the circuit and is indicated as having a compound winding, this being a feature of value but it is not a part of this invention.

C is the armature of a counter machine for regulating the field B′ of the booster. This armature is in series with the booster field winding B′ in a circuit connected across the generator so that its voltage opposes that of the generator. The electro-motive-force of C varies in accordance with the current output of the generator since the field coil C″ is in series with the generator, there being an adjustable resistance C² shunting the terminals of this coil. The counter machine C is also driven by the motor D. By this means the greater the current output of the generator the greater is the electro-motive-force of the counter machine and therefore the less is the field strength of the booster, thus varying the electro-motive-force of the booster inversely as the current of the main generator changes. The particular arrangement of these machines and the method of regulating the booster voltage form no part of the present invention.

Extending throughout the train is a conductor 1 connected to one terminal, say the positive terminal, as indicated, of the generator A, the connections between the different cars being indicated at 1ª. From the booster there extends throughout the train the conductor 2, the connections between the different cars being indicated at 2ª. The conductor 2 forms one side of a charging circuit, while the conductor 1 forms one side of the generator circuit. From the other terminal, say the negative terminal, of the generator A is the conductor 3 which also extends throughout the train, the connections between the different cars being indicated at 3ª. This conductor is connected by a loop $f$ at the end of the train, or at that portion of it to be lighted electrically and this loop connects with the conductor 4 which extends throughout those cars that are to be lighted, being connected between cars by the connector 4ª, the drawing showing only two cars to be lighted.

On each car to be lighted is a storage battery E which is connected between the conductors 2 and 3. The lights on each car are indicated at F, one terminal of the lighting circuit being connected to the conductor 4 and to one terminal of the battery. On each car is an automatic switch G having a switch lever $g$ connected to the positive terminal of the lighting circuit and fixed contacts $g'$ and $g^2$ which are respectively connected to the positive terminal of the battery and to the conductor 1 of the generator circuit. When these switches are in their lower position, as shown, the work circuit F is connected to the battery so as to be supplied with the discharging current thereof. When the switch is at the upper position with the lever $g$ engaging contact $g^2$ the lights are connected to the generator circuit and supplied thereby, while the battery is no longer connected with the lights. The various switches G each have a coil $G'$ by which they are connected, these coils being in series with the conductor 3 being the return portion of the loop conductor.

At H is indicated a main line switch on the particular train unit upon which the generating station is carried. This switch serves to open and to close the main line. It has a coil $h$ connected across the generator, being connected to conductors 1 and 3. It also has a series or current coil $h'$ connected in the conductor 3 so as to have a current corresponding with that of the generator. The function of this switch is to automatically close the circuit from the generator to the various cars when the voltage of the generator, after the same has been started up, has reached the proper value for supplying the lamps. The function of the coil $h'$ is to cause the switch to open when the battery voltage has risen sufficiently to cause a reversal of current. This reversal occurs if the battery tends to flow back to the main generator, in which case the current in returning to the negative side of the battery will pass in an opposite direction through coil $h'$ to that which it takes when the current is returning to the generator.

The principal points of difference between this system and previous systems having the same general end in view reside in the connection of the batteries and in the arrangement and actuation of the car switches G. In the present system the batteries are connected directly across the charging circuit and are never connected across the generator circuit. In previous systems of this character it has been the practice to switch the battery from the work circuit to the charging circuit, the work circuit being connected directly across the generator circuit at all times, whereas in our present system the work circuit is shifted from the battery to the generator circuit, the battery being connected to the charging circuit at all times. This enables the switches G to be actuated automatically by current coils without involving the necessity for the use of shunt coils, because if before the generator voltage had risen, and before the closing of the switch H the battery is connected directly to the generator circuit, there is no certainty that sufficient current will flow in such coils $G'$ as will cause the switch to be actuated. Moreover, this change in the arrangement of the switch with the connection of the battery across the charging circuit prevents the chattering of the switch H. In prior systems of this character it has been found that frequently if the switch H has been thrown up on the shunt coil $h$ a reverse current will flow because the battery is at a higher voltage than that of the generator. This reverse current will cause the switch H to open but the moment that it is opened the shunt coil, acting alone, will again close it, this being continued indefinitely. By our invention this chattering is prevented because there is no danger of the battery feeding back against the higher voltage of the charging circuit and, therefore, as soon as the switch H is closed and the switches G are thereafter closed the system will be maintained in operation, the lamps across the generator circuit and the battery across the charging circuit, until the generator current fails. This failure may occur either because the operator has shut down the generating plant or because the circuit has been opened, as, for example, when it is desired to add another car to the train, or when so many lights have been turned off and the charging of the battery has continued so long that it is no longer desirable to operate the generator. Another advantage of being enabled to eliminate the shunt coil for actuating the switches G is that there is no danger that the switches will be maintained in their upper position when the generator circuit becomes opened, as would occur when the loop $f$ is removed to add a new car to the train. With the switches G actuated only by a current coil in the generator circuit, the opening of the loop will necessitate the falling of the switch so that the lamps will be lighted from the battery, whereas with a shunt coil even though the generator current fails, the switch might be held in its up position where the lamps would receive no current either from the generator circuit or the battery circuit. It will be understood that particular details of construction of these various switches is not material to our present invention. We have indicated one simple form of switch, but the essential feature resides in the capacity of the switch to shift the work circuit from the battery to the generator.

It will be understood that while we have described the above system in connection with a train lighting system for which it is peculiarly adapted, yet we do not intend to limit ourselves specifically to this particular kind of system.

Having thus described our invention, what we claim as new and desire to secure by Letters Patent, is:—

1. In an electrical system of distribution, a generator and generator circuit, a booster in series with the generator and a charging circuit leading from the booster, a plurality of batteries and work circuits, a corresponding plurality of switches each having a position connecting the work circuit and generator circuit and another position connecting the work circuit with its battery, and means controlled by the current strength of the generator for actuating said switches.

2. In an electrical system of distribution, a generator and generator circuit, a booster in series with the generator and a charging circuit leading from the booster, a plurality of batteries and work circuits, a corresponding plurality of switches each having a position connecting the work circuit and generator circuit and another position connecting the work circuit with its battery and coils responsive to variations in the generator current for actuating said switches.

3. The combination of a generator, a generator circuit, a charging circuit, a plurality of batteries and work circuits, switches for connecting each work circuit either with a battery or with the generator circuit, connections independent of said switches from each battery to the charging circuit, and coils connected to receive a current strength corresponding to that of the main generator controlling the action of said switches.

4. In a system of electrical distribution for trains, a generating station on one of the train units, batteries and work circuits on other train units, two conductors leading from the generator to the various train units and adapted to have different potentials, a loop return conductor extending through the various train units, switches on the various train units determining the connection of the various batteries and work circuits, the actuation of said switches being governed solely by coils in said loop conductor.

5. In a system of electrical distribution for trains, a generator on one train unit, batteries and work circuits on other train units, conductors leading through the train from the generator, one of said conductors being a loop, a switch for each battery and work circuit, and coils fully controlling and actuating said switches connected in said loop conductor.

6. In a system of electrical distribution for trains, a generator on one of the train units, conductors leading therefrom to another train unit, one conductor being arranged as a loop, a battery, a work circuit and a switch connecting the work circuit with the battery when in one position and connecting the work circuit with one of said conductors when in another position, and means for actuating said switch to disconnect the generator and work circuits and operatively connect the battery and consumption circuit upon failure of current in the loop conductor.

7. In a system of electrical distribution for trains, a generator on one train unit, a battery and work circuit on another train unit, a generator circuit and charging circuit extending between the train units, an automatically acting switch arranged to connect one terminal of the work circuit either to one terminal of the battery or to one side of the generator circuit and electromagnetic means for operating said switch responsive to fluctuations in the generator load.

8. In a system of electrical distribution for trains, a generator on one train unit, a battery, work circuit and switch on another train unit, a generator circuit and charging circuit extending between the train units, a switch arranged to connect one terminal of the work circuit either to one terminal of the battery or to one side of the generator circuit, a conductor common to both the generator and charging circuits, and a coil in said conductor arranged to actuate said switch.

9. In an electrical system of distribution, a generator, a generator circuit and a charging circuit connected to the generator, a work circuit, a battery connected across the charging circuit and maintained out of the generator circuit, a switch adapted to connect the work circuit either to the battery or to the generator circuit, a switch arranged to open the charging circuit upon reverse current from the battery to the generator and a coil carrying said reverse current for actuating said last mentioned switch.

10. In an electrical system of distribution, a generator, a generator circuit and a charging circuit connected to the generator, a work circuit, a battery connected across the charging circuit and maintained out of the generator circuit, a switch adapted to connect the work circuit either to the battery or to the generator circuit, a switch arranged to open the charging circuit upon reverse current from the battery to the generator, and a coil for the work circuit switch in series with the latter switch.

11. In an electrical system of distribution, a generator, a generator circuit and a charging circuit connected to the generator, a plurality of work circuits, a corresponding plurality of batteries and of switches each arranged to connect a work circuit with one of the batteries or across the generator circuit, and single coils for actuating each of said switches, said coils being in series in the generator circuit.

12. In an electrical system of distribution, a generator, a generator circuit and a charging circuit connected to the generator, a plurality of work circuits, a corresponding plurality of batteries and of switches each arranged to connect a work circuit with one of the batteries or across the generator circuit, a single coil for actuating each of said switches, said coils being in series with the generator, and connections independent of said switches placing each battery across the charging circuit.

13. In an electrical system of distribution, a generator, a generator circuit and a charging circuit connected to the generator, a plurality of work circuits, a corresponding plurality of batteries and of switches each arranged to connect a work circuit with one of the batteries or across the generator circuit, a single coil for actuating each of said switches, said coils being in series with the generator, connections independent of said switches placing each battery across the charging circuit, and a main switch whose contacts are in series with said coils.

14. In an electrical system of distribution, a generator, a generator circuit and a charging circuit connected to the generator, a plurality of work circuits, a corresponding plurality of batteries and of switches each arranged to connect a work circuit with one of the batteries or across the generator circuit, a single coil for actuating each of said switches, said coils being in series with the generator, connections independent of said switches placing each battery across the charging circuit, a main switch whose contacts are in series with said coils, and means for opening said switch upon passage of current from the battery to the generator.

15. A generator, a generator circuit and a charging circuit leading therefrom, means for giving said circuits different electro-motive-forces, a battery connected across the charging circuit, a work circuit, a switch arranged to connect the work circuit either with the generator circuit or the battery, a coil for actuating said switch responsive to changes of generator current, a main switch between the generator and battery, a voltage coil for actuating said switch, and a coil for said switch in series with the generator and battery and wound to oppose the voltage coil when current flows from the battery to the generator.

16. The combination of a generator, batteries, work circuits, a switch for connecting each work circuit to its battery, a conductor connecting the various work circuits with the generator, and coils in series in said conductor forming the sole electrical means for governing the various switches.

17. In an electrical system of distribution, a source of electro-motive force, a plurality of batteries and work circuits, a charging conductor for the batteries, a feeding conductor for the work circuits, and means for connecting the work circuits to the feeding conductor responsive to certain current variations in the system as distinguished from voltage variations therein.

18. In an electrical system of distribution, a source of electro-motive force, a plurality of batteries and work circuits, a charging conductor for the batteries, a feeding conductor for the work circuits, switches for controlling the connections between the various batteries, work circuits and conductors, and coils acting to maintain said switches closed, said coils being responsive to current changes of the system as distinguished from voltage changes thereof.

19. In an electrical system of distribution, a source of electro-motive force, a plurality of train units, a work circuit and battery on each unit, a charging circuit extending through the various units for conveying the charging current from the source to the various batteries, a consumption circuit extending through the various units for conveying current from the source to the various work circuits, switches for determining the connection between each battery and the various circuits, and coils in series with the batteries for operating said switches said coils being responsive to current changes of the system as distinguished from voltage changes thereof, so that the batteries will be fed by the charging circuit and the work circuits by the consumption circuit.

20. In an electrical system of distribution, a source of electro-motive force, a plurality of train units, a work circuit and battery on each unit, a charging circuit extending through the various units for conveying the charging current from the source to the various batteries, a consumption circuit extending through the various units for conveying current from the source to the various work circuits, switches for determining the connection between each battery and the various circuits, and coils acting to maintain said switches closed, said coils being connected in series with the batteries and responsive to current changes of the system as distinguished from voltage changes thereof, so that the batteries will be fed by the charging circuit and the work circuits by the consumption circuit in accordance with the output of the generator.

In testimony whereof, we have signed our names to this specification, in the presence of two subscribing witnesses.

RUFUS N. CHAMBERLAIN.
MARCELLUS R. SHEDD.

Witnesses as to Chamberlain:
EDWIN SEGER,
ANNA DALY.

Witnesses as to Shedd:
D. W. TOMLINSON, Jr.,
H. M. IRWIN.

---

It is hereby certified that in Letters Patent No. 976,151, granted November 22, 1910, upon the application of Rufus N. Chamberlain, of Depew, and Marcellus R. Shedd, of Lancaster, New York, for an improvement in "Electrical Systems of Distribution," an error appears in the printed specification requiring correction as follows: Page 2, line 17, the reference-numeral "3" should read 4; and that the said Letters Patent should be read with this correction therein that the same may conform to the record of the case in the Patent Office.

Signed and sealed this 3d day of January, A. D., 1911.

[SEAL.]

E. B. MOORE,

*Commissioner of Patents.*